United States Patent
Patel (10) Patent No.: US 8,959,470 B2
(45) Date of Patent: Feb. 17, 2015

(54) INTEGRATED CIRCUIT WITH AREAS HAVING UNIFORM VOLTAGE DROP AND METHOD THEREFOR

(75) Inventor: Shibashish Patel, Bangalore (IN)

(73) Assignee: Advanced Micro Devices, Inc., Sunnyvale, CA (US)

(*) Notice: Subject to any disclaimer, the term of this patent is extended or adjusted under 35 U.S.C. 154(b) by 1672 days.

(21) Appl. No.: 12/126,127

(22) Filed: May 23, 2008

(65) Prior Publication Data

US 2009/0259981 A1 Oct. 15, 2009

(30) Foreign Application Priority Data

Apr. 9, 2008 (IN) .............................. 888/CHE/2008

(51) Int. Cl.
*G06F 17/50* (2006.01)
(52) U.S. Cl.
CPC ........ *G06F 17/5072* (2013.01); *G06F 2217/78* (2013.01)
USPC .......................................... 716/118; 716/119
(58) Field of Classification Search
USPC ............................... 716/100–102, 118–119 D
See application file for complete search history.

(56) References Cited

U.S. PATENT DOCUMENTS

| 6,446,248 | B1* | 9/2002 | Solomon et al. | 716/121 |
|---|---|---|---|---|
| 7,350,167 | B1* | 3/2008 | Lenahan | 716/115 |
| 7,373,620 | B1* | 5/2008 | Lenahan | 716/115 |
| 7,448,010 | B1* | 11/2008 | Lenahan et al. | 716/119 |
| 7,657,861 | B2* | 2/2010 | Vorbach et al. | 716/101 |
| 7,805,697 | B2* | 9/2010 | Wood | 716/113 |
| 2003/0229479 | A1* | 12/2003 | Smith et al. | 703/14 |
| 2003/0237069 | A1* | 12/2003 | Mohan et al. | 716/8 |
| 2004/0049754 | A1* | 3/2004 | Liao et al. | 716/8 |
| 2007/0083842 | A1* | 4/2007 | Namba et al. | 716/17 |

* cited by examiner

*Primary Examiner* — Binh Tat
(74) *Attorney, Agent, or Firm* — Faegre Baker Daniels LLP (57) ABSTRACT

A method that determines the maximum number of logic cells that can be placed in a predetermined area on the base of an integrated circuit, and meet a voltage drop requirement. The method iteratively changes the logic cell spacing until the voltage drop requirement is made. This is done prior to the placement and extraction design phases as was done in previous methods. The predetermined area may be extrapolated across the base of the integrated circuit and meet the voltage drop requirements without the need to change the power grid, or to redo the placement and extraction phases. An integrated circuit designed according to the method, and an integrated circuit design system for using the method is also disclosed.

16 Claims, 10 Drawing Sheets

*FIG. 1*

- PRIOR ART -

*FIG. 2*

- PRIOR ART -

FIG. 3

- PRIOR ART -

FIG. 4

- PRIOR ART -

*FIG. 12*

INTEGRATED CIRCUIT WITH AREAS HAVING UNIFORM VOLTAGE DROP AND METHOD THEREFOR

FIELD OF THE DISCLOSURE

The present disclosure is related to integrated circuits and voltage drops across areas of the integrated circuits, and is further related to design methods and systems for such integrated circuits.

BACKGROUND

Excessive supply voltage drop across area portions of an Integrated Circuit ("IC") may impact the chip's performance and reliability and may cause problems with the chip timing and even lead to device functional failure. Therefore, an IC design must carefully take into account and avoid any possible voltage drop issues. Avoidance of such voltage drop issues, and the power integrity of the IC design generally, may be assured through good power network planning and synthesis and by accurately analyzing the design to detect problems. Voltage drop analysis occurs at two stages of IC design. The first analysis occurs immediately post "floor planning" and the second analysis occurs after standard logic cell placement and extraction.

Figure 1:
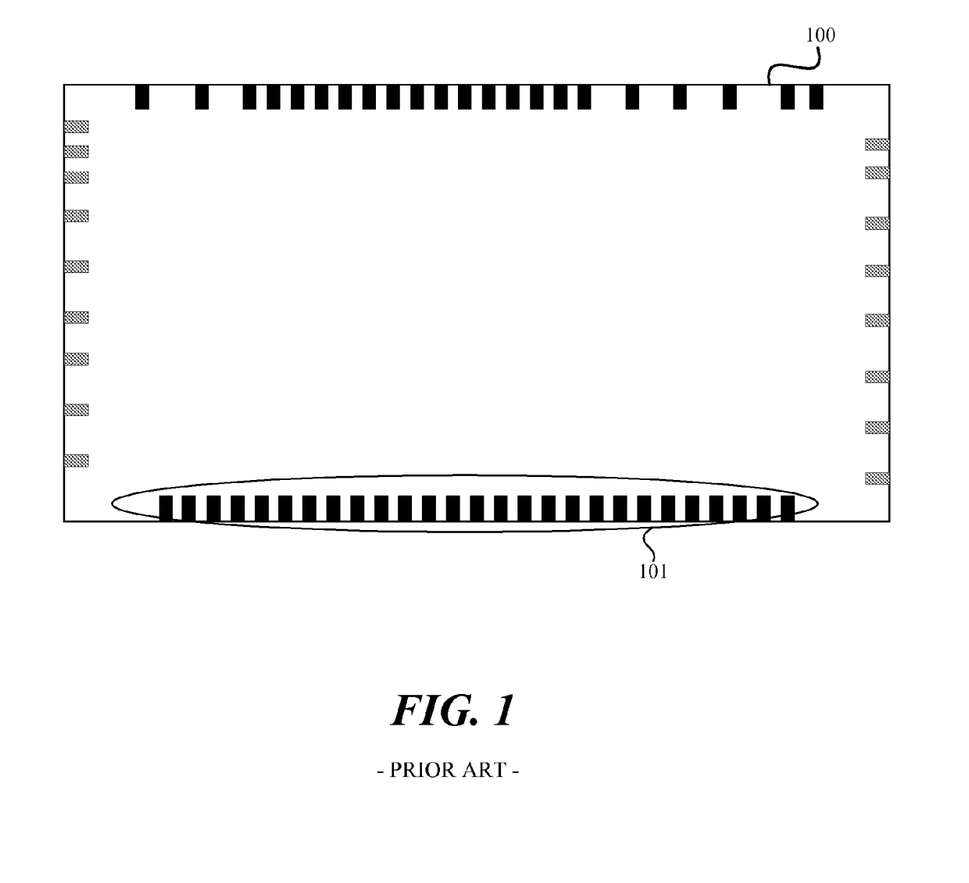
FIG. 1 is a top view of an integrated circuit base area 100 having a plurality of clustered signal ports 101.

The logic cells may serve as various functions on the integrated circuit such as, but not limited to, inverters, buffers, or generally, "repeaters" of input and output signals throughout the integrated circuit. The logic cells have a switching factor which determines how the logic cells will sink and source current. Where logic cells are clustered together on an integrated circuit, the cluster may have a corresponding voltage drop which may be unacceptable and may lead to problems such as signal timing degradation. An integrated circuit or portions of an integrated circuit may have input and output ports where the input and output ports may be clustered together in order to meet full-chip timing requirements or other logic interaction requirements of the integrated circuit. FIG. 1 illustrates an integrated circuit base area 100 which includes a plurality of signal input and output ports 101 arranged very closely together. These clustered signal ports 101 are isolated by logic cells wherein the logic cells may be, for example, inverters and/or buffers. These logic cells act as repeaters for signals coming into the block or going out of the block. The size of the logic cells is decided by various factors such as the logic cell driving capability and analysis at full-chip operating level to determine an optimal number of logic cells for meeting the desired timing and signal integrity requirements of the integrated circuit. Because the logic cells serve as repeaters they are placed as close as possible to the signal ports 101 to prevent any attenuation of the input and output signals. This leads to clustering of the repeaters near the signal ports.

Figure 2:
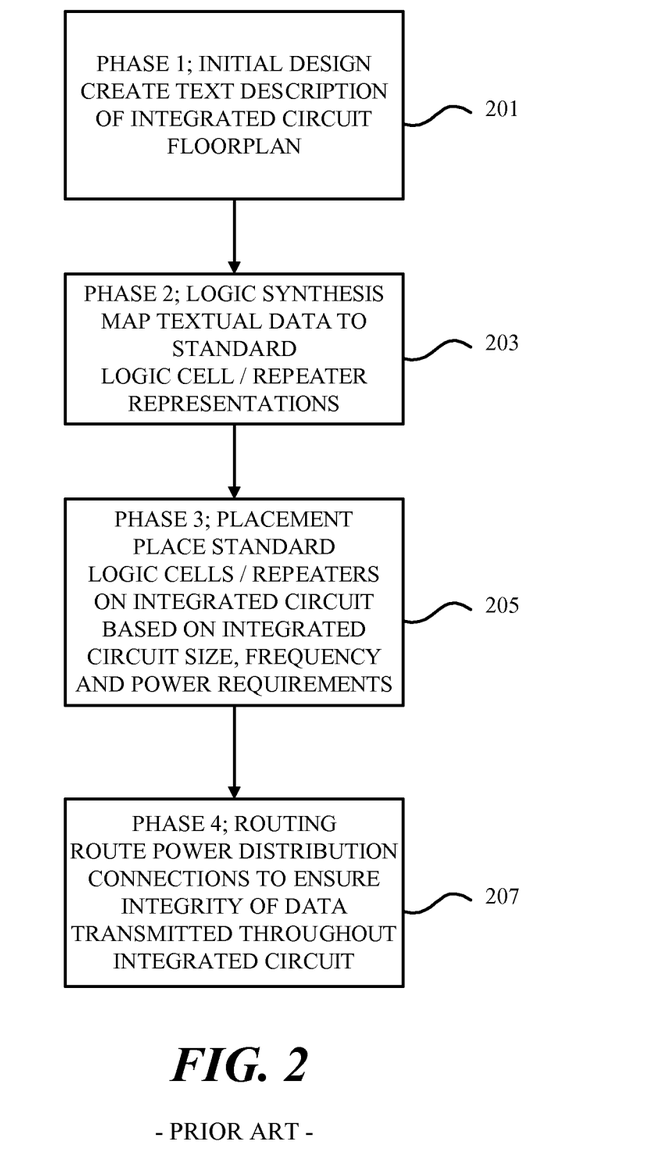
FIG. 2 is a flow chart illustrating a method of design of an integrated circuit as known in the prior art.

FIG. 2 illustrates a known method of integrated circuit design. The method of design illustrated by FIG. 2 consists of four phases. In Phase 1 as shown in block 201, the initial design is started and the integrated circuit floor plan is created. Phase 2 as shown in block 203 is referred to a "logic synthesis." In logic synthesis the textual data created in block 201 is mapped to the standard logic cell representations. Block 205 illustrates Phase 3, the "placement phase," wherein standard logic cells are placed on the integrated circuit based on the integrated circuit size and also frequency and power requirements. In Phase 4, block 207, the "routing phase" is completed. In the routing phase the power distribution connections are routed across the integrated circuit to ensure integrity of data transmitted throughout.

For example, using the method illustrated in FIG. 2, after IC floor planning and logic synthesis as shown in blocks 201 and 202, and prior to placement of any standard logic cells in block 205, an analysis proceeds by assigning regions of the IC with the voltage drop (or IR drop) budget based on estimates and previous design experience. However, the results obtained may be totally inaccurate when the standard logic cells are placed in 205 and after the second analysis is carried out post-extraction. By this time in the process, considerable design hours would have been expended for the physical design of the chip, and any subsequent adjustments to fix any IR drop violations would impact the time to "tape-out" (i.e., commencement of the manufacturing process) of the IC. Therefore, obtaining an accurate logic cell placement that meets the desired voltage drop characteristic is essential for keeping IC Design time to a minimum.

Figure 3:
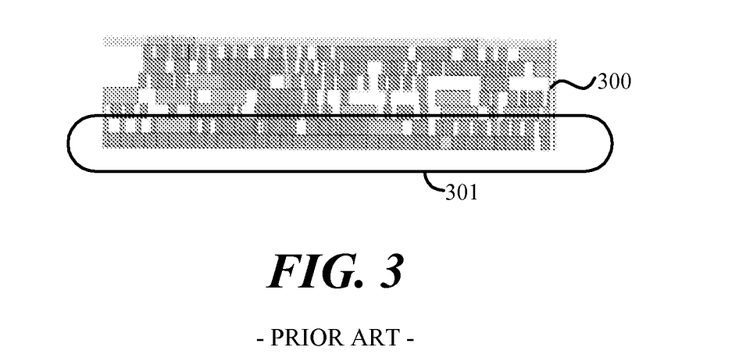
FIG. 3 is an area portion 300 of an integrated circuit having a plurality of a clustered logic cells 301 created using prior art design methods.
Figure 4:
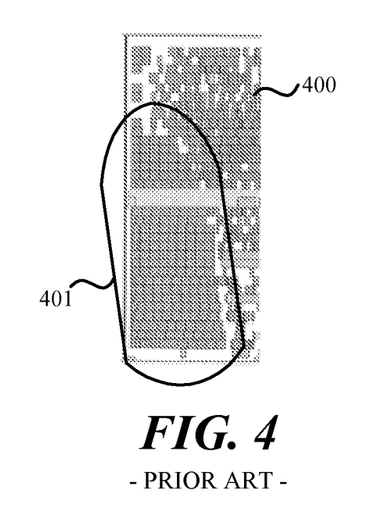
FIG. 4 is another area portion 400 of an integrated circuit also having a plurality of clustered logic cells 401 created using prior art design methods.

One approach for IC design is referred to as "divide and conquer." The IC may be divided into area portions or blocks, which are handled by multiple designers so that the design turn around time is reduced. Most of the blocks are custom designed so that the timing, area and power goals are achieved. However, due to the complex or otherwise irregular logic design required for the blocks to achieve the design constraints, commercial Computer Aided Design (CAD) tools are usually used for the physical design of the blocks. It is during the use of these commercial CAD tools that the designer does not have total control of the logic cell placement and this can impact the timing, area, power goals and signal integrity assumptions of the IC design. FIGS. 3 and 4 illustrate examples of logic cell placement that can occur using CAD tools as described. As shown in FIG. 3 an area 300 of an integrated circuit has a plurality of clustered logic cells 301 that are placed very close together with 100% logic cell utilization within the region. Likewise FIG. 4 shows an area 400 of an integrated circuit having a clustered set of logic cells 401. Such high cell utilization as shown in FIG. 3 and FIG. 4 leads to problems with the voltage drop in the area of the logic cells.

Voltage drop problems may also occur during the design process with respect to the IC power grid. The design of an IC power grid is usually standardized such that it may suit a wide variety of designs thereby reducing IC design cycle time. However, there may be cases where these standard power grids do not meet the voltage drop requirements. Changing the power grid design entails changing the CAD flow which is time consuming and requires additional design hours because the changes must be tracked and supported during the entire design cycle.

Some existing design methods perform iteration at the placement stage such as the placement stage shown in FIG. 2, block 205. The iterative methods for reducing supply voltage drop perform iterations of logic cell placement and corresponding voltage drop analysis of the placed logic cells. If a placement does not meet the desired voltage drop margin, the entire process is repeated again which is time consuming and increases the cycle time. Further such methods do not take into account cross talk between logic cells, signal integrity or the switching factor of the logic cells.

Another proposed design method estimates the power consumption of each logic cell and places logic cells with higher power consumption closer to the power supply sources. While this method takes into account total wire length and the power consumption of the logic cells to determine the logic cell placement, the method must recalculate the supply voltage drop during each placement iteration which unacceptably adds design cycle time. Further, such methods do not account for timing, area, routing resources, cross talk and logic cell switching factor. Therefore, it might happen that all logic cells having high power consumption are placed near each other in descending order which would create a local temperature hot spot. Further, the timing could become degraded if power consuming logic cells are placed away from the interacting logic.

DETAILED DESCRIPTION

The embodiments disclosed herein include a method of determining an area portion of a base area of an integrated circuit having a plurality of clustered signal ports substantially equally spaced, for initial placement of a number of logic cells, each logic cell having a length and a width, and where the logic cells are electrically coupled to the clustered signal ports. For example, the clustered signal ports are substantially equally spaced with respect to an acceptable spacing tolerance. The method fills the area portion with a maximum number of logic cells as determined by the logic cell length and width, and checks a voltage drop limit requirement. The method may further include determining that a voltage drop limit has been exceeded by the maximum number of logic cells, defining a spacing width between the logic cells to determine a reduced number of logic cells that will fit into the area portion, filling the area portion with the reduced number of logic cells; and checking said voltage drop limit requirement for the reduced number of logic cells. The method may further include determining that the voltage drop limit has not been exceeded by the maximum number of logic cells, and extrapolating the area portion with the maximum number of logic cells to the base area. The embodiments include an integrated circuit designed according to the method.

The disclosed integrated circuit includes a plurality of clustered signal ports substantially equally spaced; and an area portion of a base area having a number of substantially uniformly spaced clustered logic cells located in proximity to a set of clustered signal ports and electrically coupled thereto, each logic cell of said clustered logic cells electrically coupled to at least one signal port of the clustered signal ports, wherein the clustered logic cells have a measurably uniform voltage drop characteristic vertically across and horizontally across the area portion. Further, the integrated circuit may include at least one power distribution rail, coupled to the plurality of logic cells, wherein a voltage drop characteristic across the length of the power distribution rail is measurably uniform.

Also disclosed is an integrated circuit design system that includes at least one processor; and a memory with executable instructions for execution by the processor, that when executed cause the processor to determine an area portion of a base area of an integrated circuit, for initial placement of a number of logic cells, each logic cell having a length and a width, and electrically coupled to a set of clustered signal ports, fill the area portion with a maximum number of logic cells as determined by the logic cell length and width, and check a voltage drop limit requirement for the maximum number of logic cells.

Figure 5:
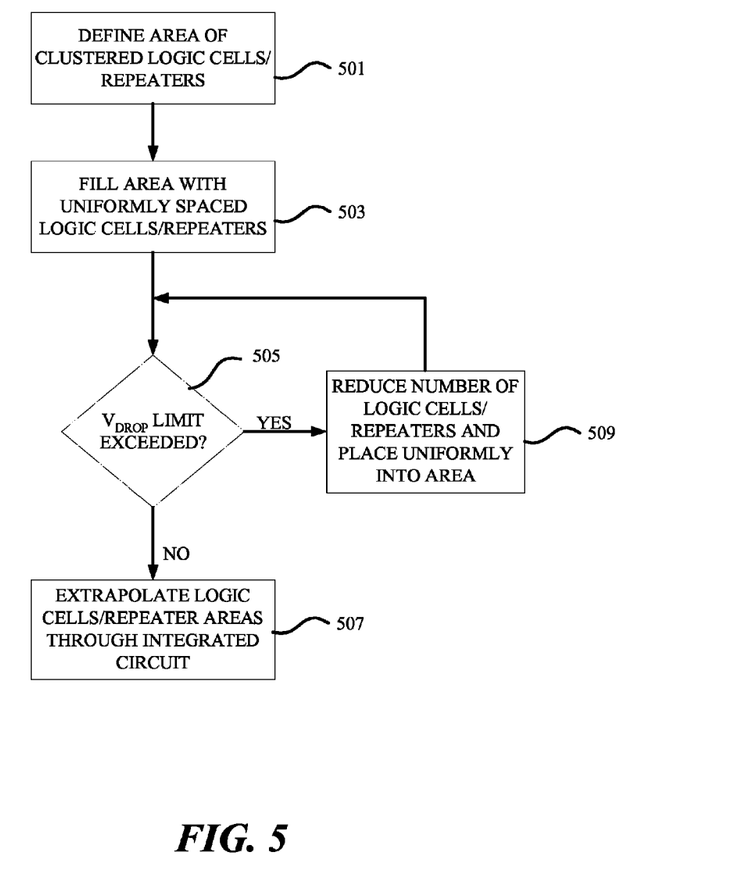
FIG. 5 is a flow chart illustrating a design operation in accordance with the embodiments.

Turning now to the drawings wherein like numerals represent like components, FIG. 5 is a flow chart illustrating operation of a method in accordance with the embodiments. In 501 an area of an integrated circuit base area such as the integrated base area 100 shown in FIG. 1, is defined for placement of a group of logic cells. For example, the logic cell grouping may be near a plurality of clustered signal ports, such as clustered signal ports 101 illustrated in FIG. 1. The defined area is not the entire base area of the integrated circuit but rather is a redefined sub area wherein the voltage drop will be determined. The power drain caused by the logic cells is dependent on the number of logic cells per unit of area. Therefore, the initial area chosen is small with respect to the overall integrated circuit base area.

In block 503 the predetermined area is then filled with substantially uniformly spaced logic cells. For example, the clustered signal ports are substantially uniformly spaced with respect to an acceptable spacing tolerance. The acceptable spacing tolerance may be determined by the technology and/or processes employed such as, but not limited to, CMOS, etc. It is to be understood that in block 503 substantially uniformly spaced may also include logic cells that are placed immediately next to one another so that there is substantially no physical distance between the logic cells. That is, the logic cells may be placed immediately next to one another within an acceptable spacing tolerance as previously discussed. In 505, the area is then tested for its voltage drop characteristic. If the voltage drop limit is exceeded in block 505 then the number of logic cells placed in the area is reduced as shown in block 509 and the voltage drop calculation is repeated in 505. When the voltage drop limit is not exceeded in block 505, then in block 507 the number of logic cells per area is extrapolated throughout the integrated circuit. In other words, the result of FIG. 5 is a small area portion of the integrated circuit base area and a given number of logic cells that will meet the voltage drop requirements for the integrated circuit for that predetermined area.

Figure 6:
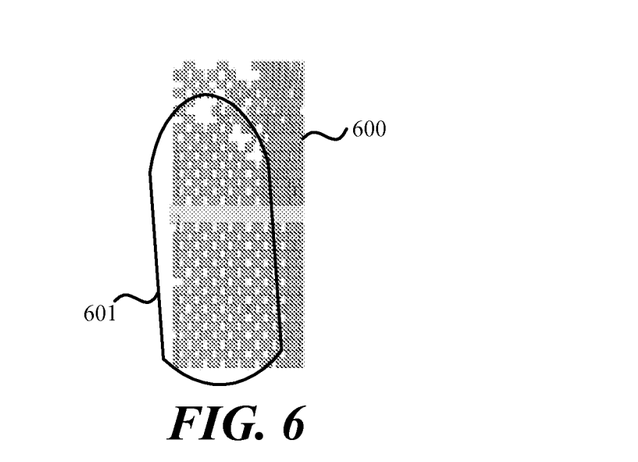
FIG. 6 is a top view of an area portion 600 of an integrated circuit having a plurality of logic cells 601 placed in accordance with an embodiment.
Figure 7:
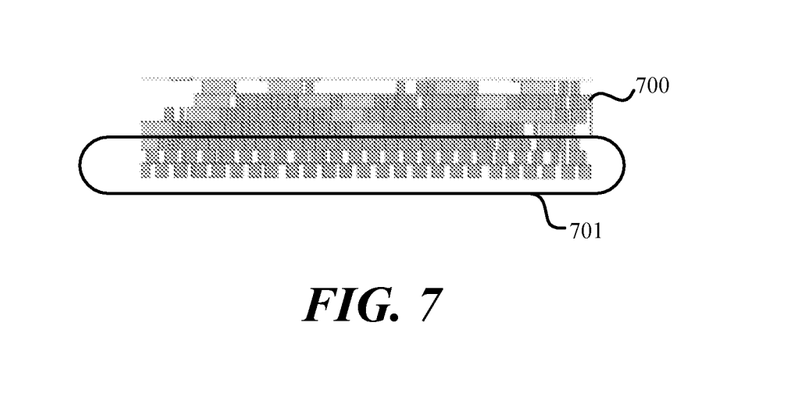
FIG. 7 is an area portion 700 of an integrated circuit having another area of logic cells 701 in accordance with an embodiment.

FIG. 6 and FIG. 7 illustrate top views of integrated circuit areas for example integrated circuit area 600 and integrated circuit area 700. The integrated circuit area 600 has a plurality of cluster logic cells 601. The plurality of clustered logic cells 601 were placed in accordance with embodiment and the method illustrated by FIG. 5. As can be seen in FIG. 6 and also in FIG. 7, the logic cells are placed with a uniform spacing. Therefore the clustered logic cells 601 and 701 as shown in FIG. 6 and FIG. 7 respectively, may comprise a set of areas having logic cells as determined the method illustrated in FIG. 5. For example, the set of clustered logic cells 601 may be a set of extrapolated areas, each area having the maximum set of logic cells as determined the method in FIG. 5.

Figure 8:
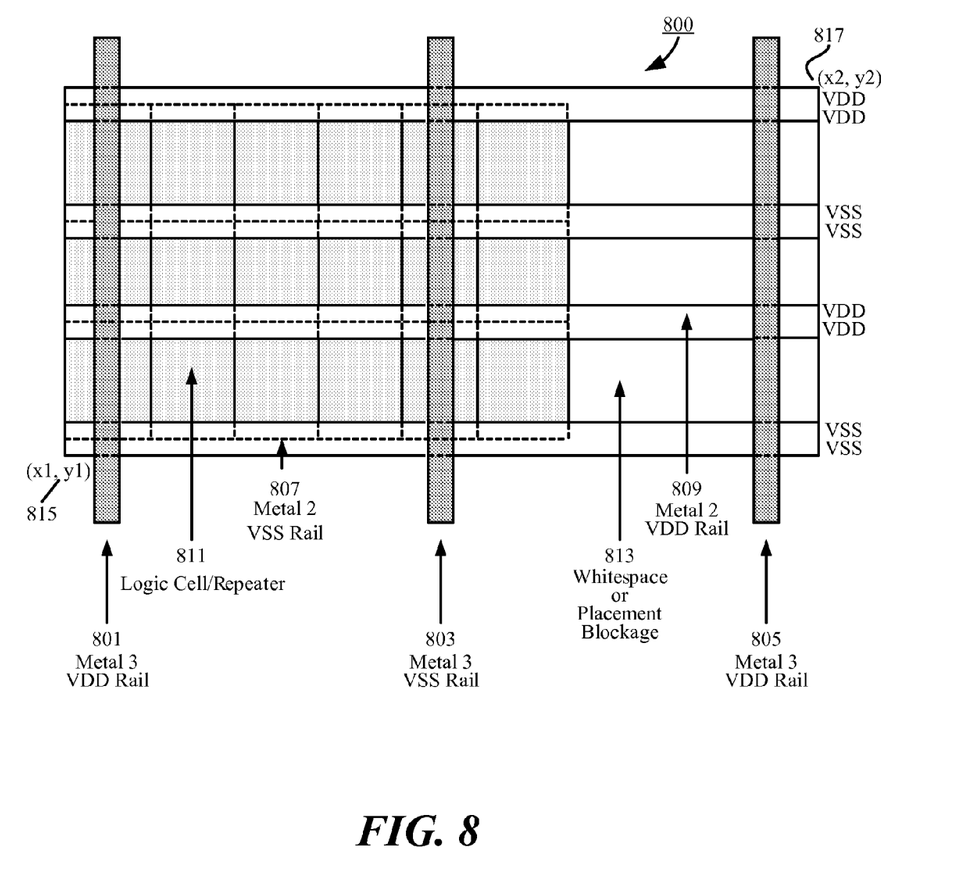
FIG. 8 is a top view of an integrated circuit area portion 800 illustrating an initial placement of logic cells with respect to the power grid of the integrated circuit in accordance with an embodiment.
Figure 9:
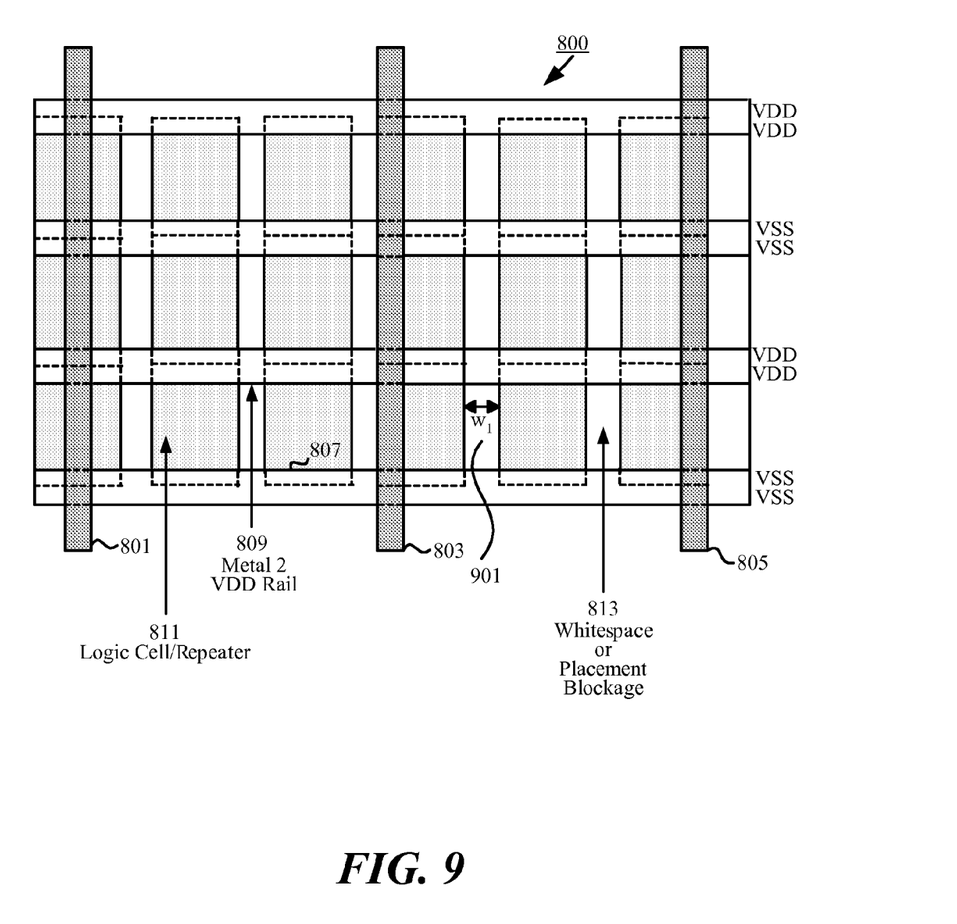
FIG. 9 illustrates a top view of the area portion 800 of an integrated circuit having a set of logic cells placed so as meet the voltage drop requirements of the integrated circuit in accordance with an embodiment.

FIG. 8 illustrates a top view of an area portion 800 of an integrated circuit and its corresponding power rails. The power rails are located at various layers of the integrated circuit. For example, the vertically positioned voltage supply rails 801, 803 and 805 are located at metal layer 3 of the integrated circuit. The vertically positioned voltage rails 801, 803 and 805 are connected to horizontal voltage rails by via. For example, vertically positioned rail 803, which provides voltage supply "$V_{ss}$," is connected by via to one or more horizontally positioned rails at metal layer 2, such as rail 807. Vertically positioned rail 801 and rail 805, both of which provide voltage supply "$V_{DD}$," are connected by via to, for example, horizontally positioned rail 809, which is at metal layer 2 of the IC. As illustrated by the method of FIG. 5, block 501, the area portion 800 is determined. The area portion 800, may be defined by, for example, its corners 815 and 817. The method then places logic cells such as logic cell 811 into the area substantially uniformly spaced. In the example illustrated by FIG. 8, the logic cells are placed right next to each other without any substantial amount of spacing. The voltage drop for the logic cells is then calculated with respect to the voltage rails, such as the voltage rails 801, 803 and 805 located at the metal 3 layer of an integrated circuit, and also for the horizontal voltage rails as such as voltage rail 807 and 809 which are at the metal 2 layer of the integrated circuit. If the voltage drop is found to be unacceptable then the cells are replaced having a larger spacing as illustrated in FIG. 9. Therefore in FIG. 9, the area portion of the integrated circuit 800 is again shown, however in FIG. 9 the logic cells 811 are now placed with a width "$W_1$," 901. If the new added width 901, (i.e. the spacing), results in the voltage drop requirements being met, then the maximum number of logic cells for the integrated circuit area 800 has been determined. However as one of ordinary skill would understand, as the spacing 901, increases the number of logic cells 811 that would fit in the base area 800 may be reduced.

Figure 10:
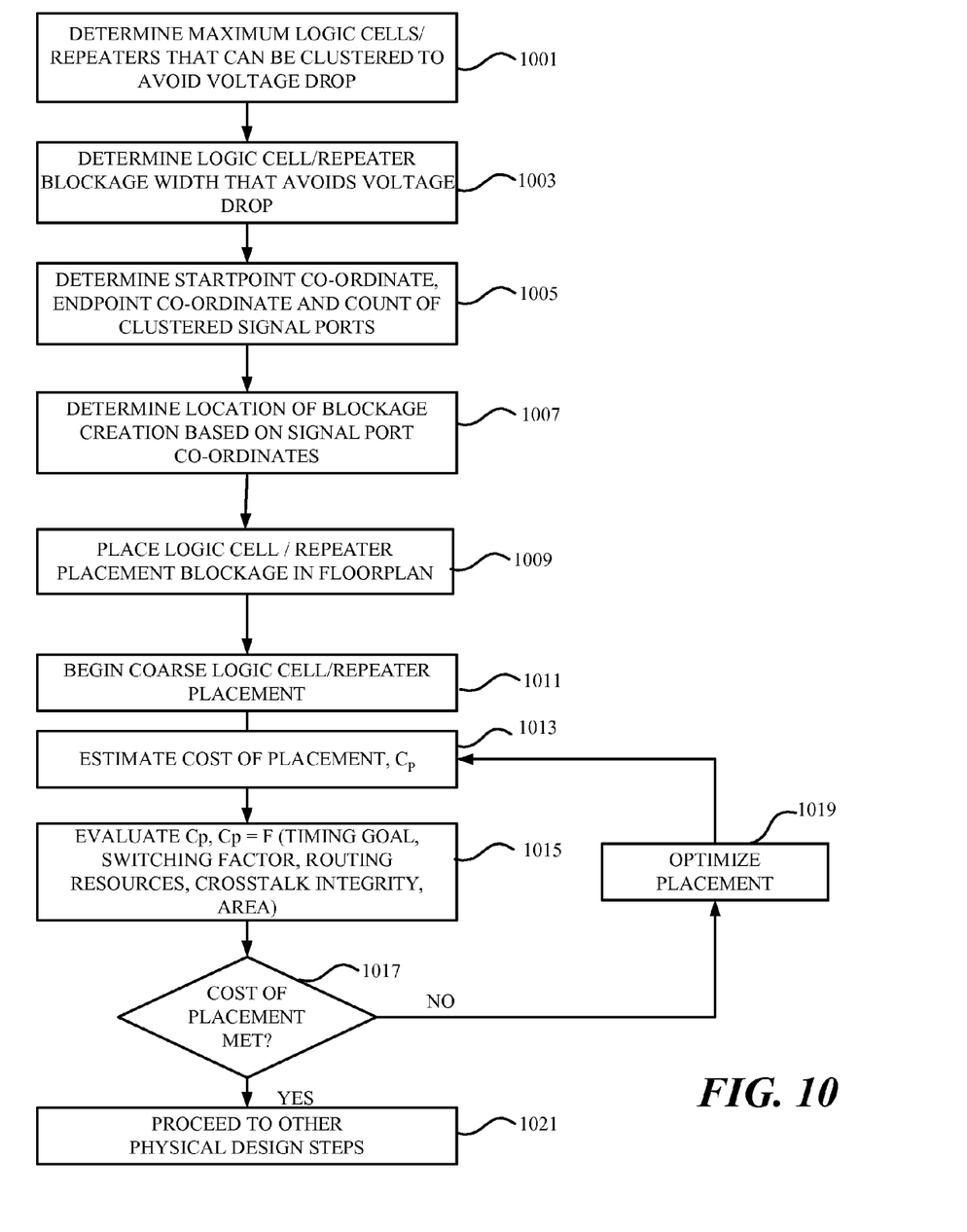
FIG. 10 is a flow chart illustrating further details of operation of a method in accordance with an embodiment as shown in FIG. 5.

FIG. 10 illustrates additional details of the method illustrated in FIG. 5 in accordance with the embodiments. In 1001, the maximum number of logic cells that can be clustered and still avoid the voltage drop problem is determined. In 1003, an appropriate blockage width is determined for placement of the logic cells. For example, returning briefly to FIG. 9, the width 901 between the logic cells 811 would be determined such that the number of logic cells within the area 800 would not exceed the voltage drop requirements for the integrated circuit. In 1005, a start point and end point coordinate of an integrated circuit area is determined. For example, in FIG. 8, a start point 815 and end point 817 for area 800 would be determined. Also in 1005 the number of clustered signal ports is determined. For example as shown in FIG. 1 a plurality of clustered signal ports in 101 is present in the design of the integrated circuit area 100.

In 1007 the location of the blockage based on the signal port coordinates is determined. For example, the logic cells having a certain spacing width will be placed on the predetermined area in accordance with the start and end point coordinates and also the location of the signal ports. In 1009, the logic cells are placed onto the integrated circuit area. The method of the embodiments as shown in FIG. 10 includes calculation of a cost function "Cp" as shown in 1013. The cost function Cp as shown in 1015, takes into account the timing goal of the integrated circuit, the switching factor of the logic cells, the routing resources, for example the power rails illustrated by FIG. 8 and FIG. 9, the cross talk integrity between the logic cells and also the signal ports, and the area. Taking the switching factor of the logic cells into account is important because the switching factor determines how the logic cells will sink and source current within the integrated circuit. The electrical current usage of the logic cells is used to determine the voltage drop of the logic cells placed within an area as would be understood of one of ordinary skill. Thus in block 1017, if the cost of placement is met, then the method proceeds to the other physical design steps as shown in block 1021. However, if the cost function shows that the cost of placement is not met in block 1017, then as shown in block 1019, placement of the logic cells is optimized and the cost function is again estimated as shown in block 1013. For example as was previously described with respect to FIG. 8 and FIG. 9, the logic cells as placed on the integrated base area 800 may be placed again having an increased spacing such as the spacing or blockage width 901 illustrated in FIG. 9. As was discussed previously, by increasing the blockage width 901 the overall number of logic cells that would fit within the area 800 may be reduced. However as was described with respect to FIG. 5, the voltage drop characteristic for the logic cells as placed must be uniform such that the voltage drop across for example, metal rail 809, metal rails 801, 803 and 805, are uniform.

Figure 11:
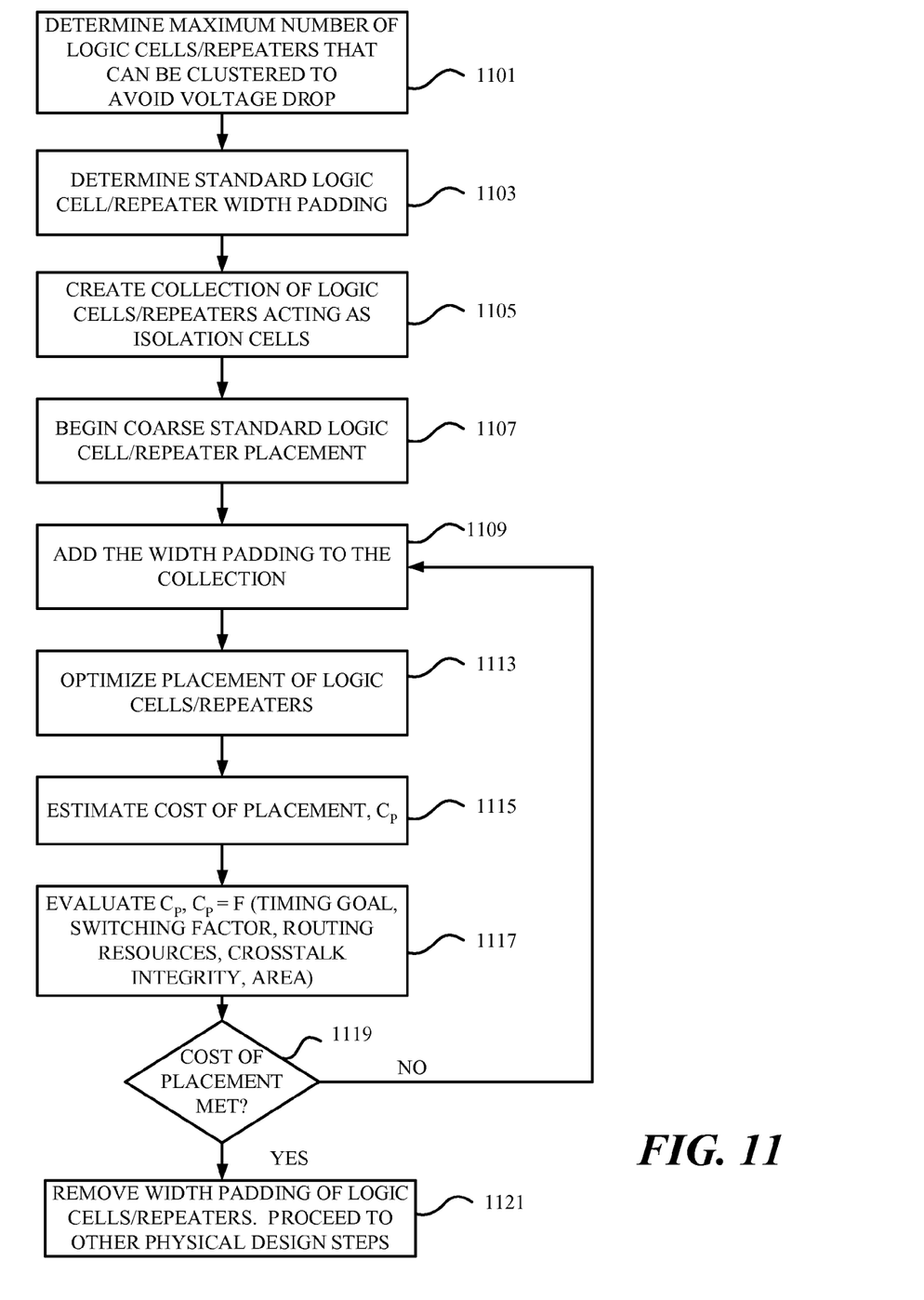
FIG. 11 is a flow chart showing another embodiment of the method herein disclosed.

FIG. 11 illustrates another embodiment of the method herein described. In 1101 the maximum number of logic cells that can be clustered and yet meet the voltage drop requirements is determined. In 1103, and in accordance with the embodiment illustrated by FIG. 11, the width padding is determined for the logic cells. That is, rather than determining the spacing width, such as the spacing 901 illustrated in FIG. 9, the blocks are viewed having an overall larger individual width (the "width padding"). The increased width of the logic cells may cause a reduction in the number of logic cells that will fit into the area portion. Therefore adding the padding width allows for a reduced number of logic cells to be effectively determined where the reduced number of logic cells meets the voltage drop requirements. The logic cells are then combined as a collection to fit within the predetermined area as shown in 1105, and coarse placement of logic cells occurs as shown in 1107. The width padding may be added to the collection of logic cells as shown in 1109. In 1113, the placement of logic cells may then be optimized the cost function is estimated as shown in 1115 and evaluated as shown in 1117. If the cost of placement is met and block 1119, then the padding width may be removed because the number of logic cells for the given area has been determined. In 1121, the method may then proceed to the other physical design steps. However if the cost of placement was not met in 1119, the process returns to block 1109 and increases the width padding to the collection of logic cells. It then repeats the optimization steps including estimation and evaluation of the cost function as shown in block 1115 and block 1117.

Figure 12:
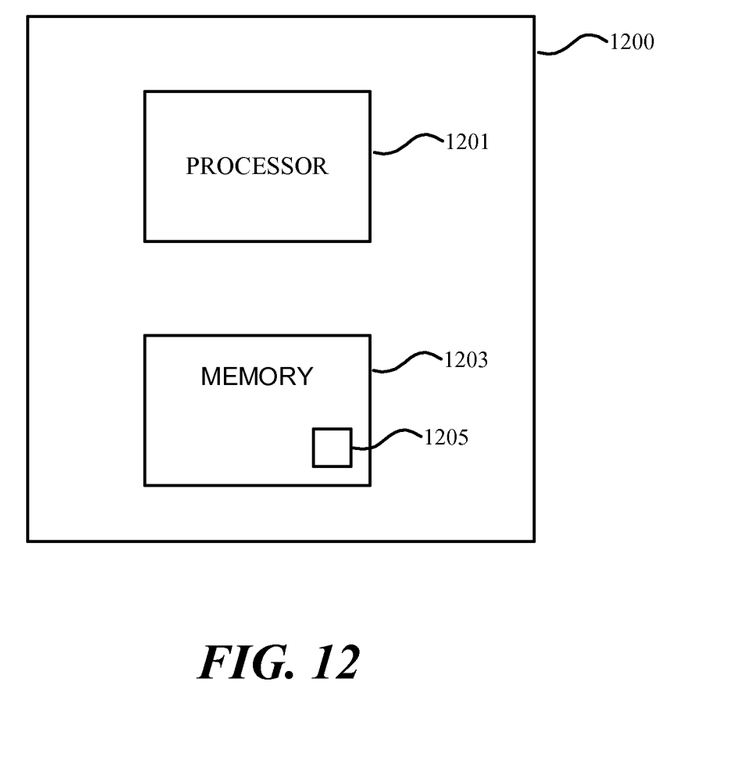
FIG. 12 is a block diagram of an integrated circuit design system 1200 having a processor, a memory and executable instructions.

FIG. 12 is a block diagram illustrating an integrated circuit design system which includes the work station 1200. The work station 1200 further includes a processor 1201 and at least one memory 1203. The memory 1203 is coupled to the processor 1201 and includes executable instructions 1205. The executable instructions are for execution by the processor 1201 and when executed cause the processor to determine an area portion of a base area of an integrated circuit for initial placement of a number of logic cells. Each logic cell has a length and a width and a number of logic cells are electrically coupled to a plurality of clustered signal ports, for example, the clustered signal ports 101 as illustrated earlier in FIG. 1. The processor then fills the area portion with a maximum number of logic cells as determined by the logic cell length and width and checks a voltage drop limit requirement for the maximum number of logic cells. The executable instructions 1205 include all the functionality of the methods illustrated by FIG. 5, FIG. 10 and FIG. 11.

Therefore, as shown previously in FIG. 6 and FIG. 7, an integrated circuit of the embodiments may have an area portion, for example, area portion 600 or area portion 700, which have a plurality of clustered logic cells, for example, in FIG. 6 clustered logic cells 601 and in FIG. 7 clustered logic cells 701. The clustered logic cells, clustered on the area portion of the integrated circuit, may be in proximity to a set of clustered signal ports and electrically coupled thereto. For example, as was shown in FIG. 1, the clustered signal ports 101 on the integrated circuit base area 100 may be coupled to the logic cells, for example, the logic cells as shown by FIG. 6 and FIG. 7 as clustered logic cells 601 and clustered logic cells 701. Each of the logic cells of the clustered logic cells, for example, clustered logic cells 601 and clustered logic cells 701 may be electrically coupled to one of the signal ports, for example, signal ports 101 shown in FIG. 1. The clustered logic cells such as clustered logic cells 601 and clustered logic cells 701 will have a measurably uniform voltage drop characteristic both vertically and horizontally across their respective area portions 600 and 700. The voltage drops measured at any point along any voltage rail, such as the vertically positioned and horizontally positioned voltage rails illustrated by FIG. 9, would be measurably uniform along the length of the voltage rail.

Simulation results have shown that the methods of the present embodiments are able to consistently achieve the voltage drop requirements for groups of clustered logic cells on an integrated circuit unlike prior art methods.

Some embodiments may include software code, such as, but not limited to, Hardware Description Language (HDL) code, HDL code for ASIC generation, and/or various netlists, etc., stored on a computer readable media such as, but not limited to, CDs, DVDs, PROMs, ROMs, flash memory storage devices and/or any other suitable memory storage. The software code on the computer readable media is suitable for execution by one or more processors for design simulation, and/or CAD/CAM systems for control of production lines, etc., for producing ICs, ASICs, etc. in accordance with the embodiments.

Therefore, in accordance with the embodiments, a small area having a set of clustered logic cells is determined wherein the small area meets the voltage drop requirements of the IC. The small area which meets the voltage drop requirements is then extrapolated throughout the surface of the IC such that the entire IC and the area having the clustered logic cells overall meets the voltage drop requirements of the IC.

What is claimed is:

1. A method comprising:
   filling, by a computer based integrated circuit design system, an area portion of a base area of an integrated circuit having a plurality of clustered signal ports substantially equally spaced, with a maximum number of logic cells as determined by length and width of each logic cell, said number of logic cells for electrically coupling to said plurality of clustered signal ports; and
   checking, by the integrated circuit design system, a voltage drop limit requirement for said maximum number of logic cells.

2. The method of claim 1, comprising:
   determining that said voltage drop limit has been exceeded by said maximum number of logic cells;
   defining a spacing width between said logic cells to determine a reduced number of logic cells that will fit into said area portion;
   filling said area portion with said reduced number of logic cells; and
   checking said voltage drop limit requirement for said reduced number of logic cells.

3. The method of claim 1, comprising:
   determining that said voltage drop limit has not been exceeded by said maximum number of logic cells;
   extrapolating said area portion having said maximum number of logic cells to said base area for placement of a required number of logic cells.

4. The method of claim 1, comprising:
   determining an area portion of said base area of said integrated circuit, for initial placement of said number of logic cells, further comprising:
      determining a starting point coordinate and an endpoint coordinate, for defining a location of said plurality of clustered signal ports on said base area; and
      determining a blockage width based on said starting point coordinate and said endpoint coordinate, said blockage width defining a spacing between said number of logic cells.

5. The method of claim 2, wherein defining a spacing width between said logic cells, is further comprising:
   adding a padding width to said logic cell width, said padding width for effectively determining said reduced number of logic cells.

6. The method of claim 2, comprising:
   evaluating a cost function, said cost function including a signal propagation time parameter, a logic cell switching factor, a routing parameter, a crosstalk parameter and an area parameter corresponding to a logic cell cluster.

7. An integrated circuit designed according to the method of claim 1.

8. An integrated circuit design according to the method of claim 1, stored on a computer readable media.

9. A non-transitory computer readable media comprising:
   executable instructions for execution by one or more processors, that when executed cause the one or more processors to:
   fill an area portion of a base area of an integrated circuit having a plurality of clustered signal ports substantially equally spaced, with a maximum number of logic cells as determined by length and width of each logic cell, said number of logic cells for electrically coupling to said plurality of clustered signal ports; and
   check a voltage drop limit requirement for said maximum number of logic cells.

10. The computer readable media of claim 9, wherein said executable instructions, when executed further cause the one or more processors to:
    determine that said voltage drop limit has been exceeded by said maximum number of logic cells;
    define a spacing width between said logic cells to determine a reduced number of logic cells that will fit into said area portion;

fill said area portion with said reduced number of logic cells; and check said voltage drop limit requirement for said reduced number of logic cells.

11. The computer readable media of claim 9, wherein said executable instructions, when executed further cause the one or more processors to:

determine that said voltage drop limit has not been exceeded by said maximum number of logic cells;

extrapolate said area portion having said maximum number of logic cells to said base area for placement of a required number of logic cells.

12. The computer readable media of claim 10, wherein said executable instructions, when executed further cause the one or more processors to:

determine an increased blockage width, said blockage width defining a spacing between said reduced number of logic cells.

13. The computer readable media of claim 9, wherein said executable instructions, when executed further cause the one or more processors to:

determine a starting point coordinate and an endpoint coordinate, for defining a location of said plurality of clustered signal ports on said base area; and determine a blockage width based on said starting point coordinate and said endpoint coordinate, said blockage width defining a spacing between said number of logic cells.

14. The computer readable media of claim 10, wherein said executable instructions, when executed further cause the one or more processors to:

add a padding width to said logic cell width, said padding width for effectively determining said reduced number of logic cells.

15. The computer readable media of claim 10, wherein said executable instructions, when executed further cause the one or more processors to:

evaluate a cost function, said cost function including a signal propagation time parameter, a logic cell switching factor, a routing parameter, a crosstalk parameter and an area parameter corresponding to a logic cell cluster.

16. An integrated circuit design system comprising:

at least one processor; and a memory comprising: executable instructions for execution by said at least one processor, that when executed cause the at least one processor to:

determine an area portion of a base area of said integrated circuit, for initial placement of a number of logic cells, each logic cell having a length and a width, said number of logic cells for electrically coupling to said plurality of clustered signal ports;

fill said area portion with a maximum number of logic cells as determined by said length and said width of each logic cell; and check a voltage drop limit requirement for said maximum number of logic cells.

* * * * *